United States Patent
Benz

[11] 3,800,646
[45] Apr. 2, 1974

[54] FLYING GUILLOTINE SHEARS
[75] Inventor: Willi Benz, Neuss, Germany
[73] Assignee: Schloemann Aktiengesellschaft, Dusseldorf, Germany
[22] Filed: Mar. 6, 1973
[21] Appl. No.: 338,571

[30] Foreign Application Priority Data
Mar. 6, 1972 Germany.................. P 22 10 699.6

[52] U.S. Cl. ................................................ 83/320
[51] Int. Cl............................................ B23d 25/04
[58] Field of Search..................... 83/320, 319, 318

[56] References Cited
UNITED STATES PATENTS
3,152,502  10/1964  Rybak et al.......................... 83/320

Primary Examiner—J. M. Meister
Attorney, Agent, or Firm—Holman & Stern

[57] ABSTRACT

The flying guillotine shears of the invention are for shearing moving rolled stock and have a blade carriage which moves in the same direction as and at the same speed as the stock and two co-operating blades on the blade carriage, one of the blades moving vertically in order to make the shear cut. The moving blade is directly coupled to a crank shaft by a connecting rod, and the crank shaft is connected to the carriage by a link in order to take up the reaction to the shear cut and is also connected to a fixed member by means of a radius rod so that the crank shaft is pivotal about an axis which is at approximately the same height as the crank shaft axis.

5 Claims, 6 Drawing Figures

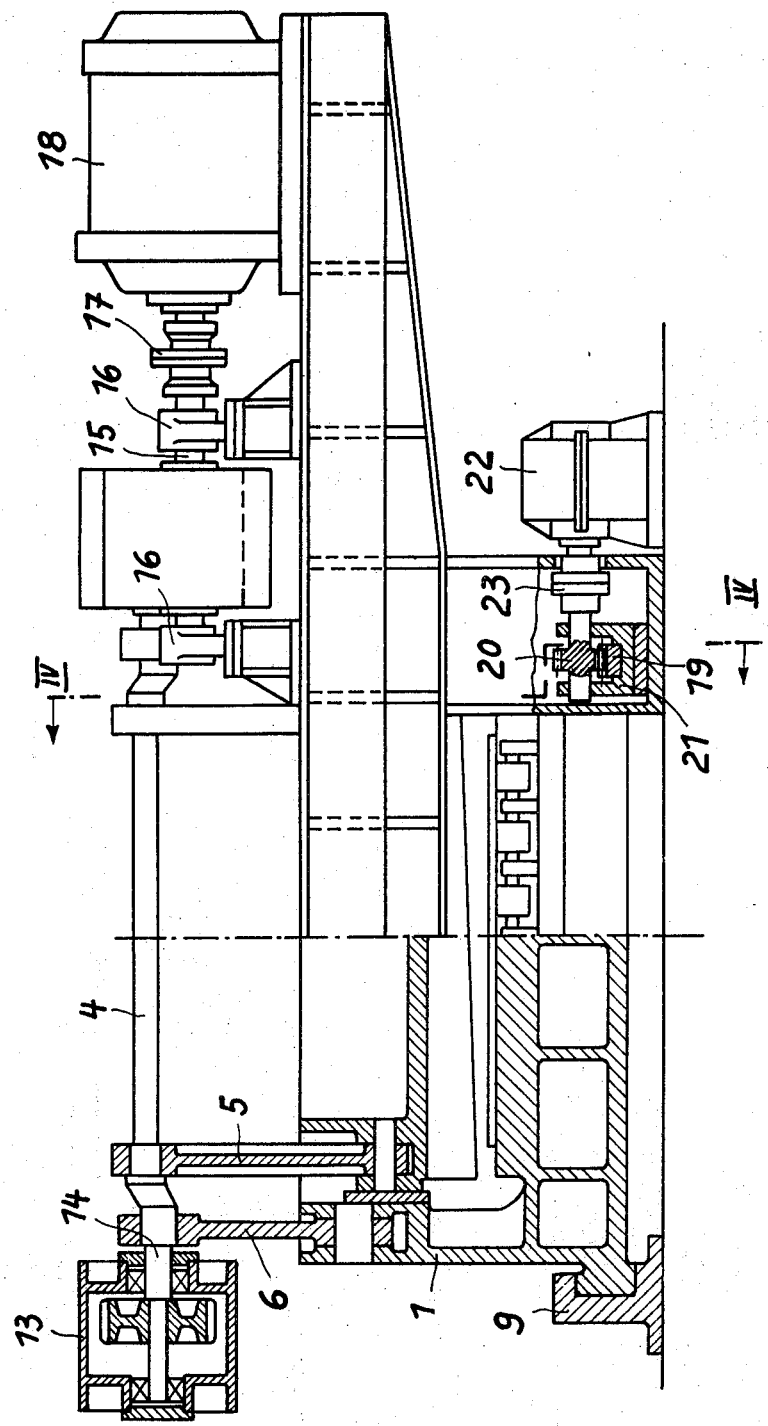

FLYING GUILLOTINE SHEARS

BACKGROUND OF THE INVENTION

The invention relates to flying guillotine shears for shearing moving stock, e.g., rolled stock, of the type having a blade carriage which can be reciprocated in the direction of movement of the stock. The carriage carries mounts for mounting two co-operating blades, at least one of which (and normally only one of which) blade mounts is guided for substantially vertical movement with respect to the carriage. The blade mount may be part of the respective blade, but normally, the blade will be a separate, inter-changeable member which is mounted by the mount.

There are many guillotine shears of this type which differ in regard to the kind of drive for the carriage as well in regard to the kind of drive for the blade mount. The invention relates to shears in which the blade mount is moved independently of the carriage and is driven by the connecting rod of a crank drive. On one hand, such shears permit prolonged synchronism between the blades and the stock during the cut and provide good adaptation of the speed of the blades to the speed of the stock. On the other hand, separation of the two drives enables the speed of the carriage to be maintained constant during the cutting operation without causing any problems. This is because it has been found that if the drives for the carriage and for the blade mount are provided by a common crank shaft, the cutting pressure, which starts with an impact, leads to a speed reduction in the motor and therefore to a brief deceleration of the blade carriage.

However, it is usually a property of known shears of this type, including those with a carriage drive which is independent of the blade drive, and those in which the carriage and the blade have a common crank drive that the reaction to the shearing force is transmitted through the slideways of the blade carriage. The disadvantage of this is that the cutting forces increase the frictional forces. The sliding surfaces must therefore be made larger to prevent excessive wear; furthermore, synchronism of the carriage is disturbed by the additional frictional forces, which additional forces occur in surges.

It would be possible to avoid these disadvantages by supporting the blade-drive crank shaft directly in the casing of the blade carriage. However, this would mean that the crank shaft would have to be reciprocated together with the carriage and the moving mass would therefore become larger so that more powerful drives would be required for the carriage. Moreover, a stationary transmission would have to be coupled through a correspondingly long universal shaft to the crank shaft, a fact which would increase the moving masses still further. In addition, the entire plant would occupy more space which would severely militate against installation of such shears.

German Pat. specification No. 948,664 discloses guillotine shears of the type referred to above in which the blade is moved independently of the carriag drive and is driven by the connecting rod of a crank drive. However, this crank drive is not applied directly to the blade mount via the connecting rod but via an upper vertically (but not horizontally) movable frame connected with the crank drive by the connecting rod and other members, the moving blade mount being slidably retained by horizontal guide surfaces on the upper movable frame. However, compared with other shears, these shears not only have twice as many sliding surfaces (top and bottom) but also have a very heavy action because they have an upper movable frame which is positioned like a canopy over the carriage and is coupled to a lower vertically movable frame by means of four columns which are guided for vertical movement by a housing of the crank. The shears are for tube cropping, and although the mass of the carriage is relatively small, this advantage does not play an important part because of the usually slow feed rate of tube when compared to the substantially higher feed rate of plate or sheet; as this advantage is obtained at the cost of two additional sliding surfaces and a substantially more complex blade drive, these shears do not represent any usable basis for further development.

SUMMARY OF THE INVENTION

The present invention provides flying guillotine shears for shearing moving stock, the shears having:

stationary mounting means (which may be the machine frame or bed or may be a foundation);

a movable blade carriage guided for movement in a direction of movement of the stock;

moving means for moving the carriage, arranged such that the carriage can be moved in the same direction as and at the same speed as the stock during a cut;

blade mounts for mounting two co-operating shear blades, the blade mounts being carried by the carriage and at least one of the blade mounts being guided for substantially vertical movement with respect to the carriage;

a rotary crank shaft which is independent of the carriage moving means for moving the moving blade mount to make a shearing cut;

at least one connecting rod, being pivotally connected to the crank shaft and directly to the moving blade mount for transmitting force from the crank shaft to the moving blade mount;

at least one link connecting the crank shaft to the carriage for transmitting the reaction to the shearing force from the carriage to the crank shaft; and at least one radius member connecting the crank shaft to said mounting means, the radius member being pivotal with respect to the mounting means about an axis at approximately the same height as the axis of rotation of the crank shaft.

In the shears of the invention, the sliding surfaces for guiding the carriage do not need to transmit the reaction to the shearing force, but there need not be any increase in the magnitude of the moving masses. The crank shaft performs only a slight arcuate vertical reciprocating motion, thus requiring only a relatively short universal shaft in order to couple the crank shaft to the output shaft of a transmission if a conventional type of transmission is used. There is no need for additional space for a special transmission to the side of the shears. It is even possible to dispense completely with the universal shaft when using an elongated gear transmission between the crank shaft and the motor if the output shaft of the gear transmission is connected to or forms an integral unit with the shaft of the crank and is connected by means of said link to the carriage while at its input drive side, the transmission is mounted so as to be pivotal above the axis of its input shaft. In this case, the casing of the transmission acts as the radius member and may be placed close to the shears. The input end of the transmission may be supported in a very simple manner by pivotally supporting the input shaft in stationary bearings.

The carriage drive should permit the longest possible synchronization during the cutting operation. Transmissions utilizing cam discs or hydraulically actuated piston motors cannot perform this function satisfactorily for rolled stock travelling at increasing speeds with which the shears should be able to cope. In order to ensure good results even for rolled stock travelling at high speeds, it is particularly advantageous if the carriage is moved by a rack and pinion mechanism.

BRIEF DESCRIPTION OF THE DRAWINGS

An embodiment of the shears of the invention is illustrated by way of example in the accompanying drawings and will now be described. In the drawings:

FIG. 3 is a more detailed front view of the shears, with a partial section through the blade transmission and slide rails.

DETAILED DESCRIPTION OF THE PREFERRED EMBODIMENT

Figure 1:
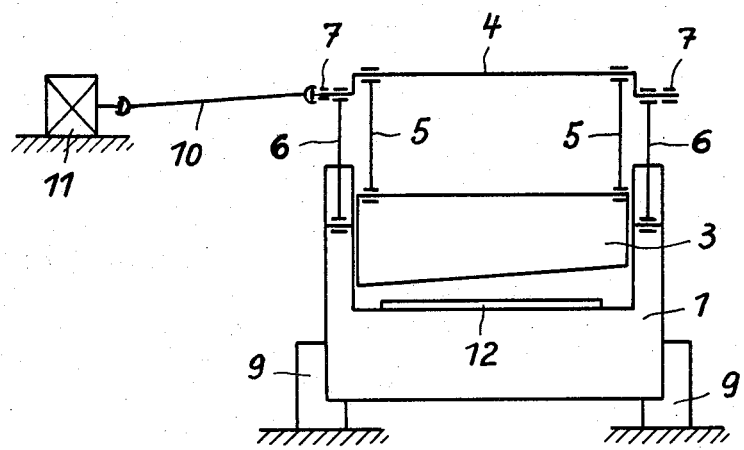
FIG. 1 is a diagrammatic front view of the shears.

The shears have a reciprocable blade carriage 1 which is guided by slide rails 9. The blade carriage 1 supports a stationary bottom blade mount 2 and a top blade mount 3 which is guided for vertical reciprocation and is coupled by a connecting rod 5 to a crank shaft 4 and is driven thereby. The bearings of the crank shaft 4 are coupled on the one hand via links 6 to the blade carriage 1 and are also arranged to pivot by means of a radius member in the form of a radius rod 7 (see FIG. 2), about a fixed axis 8 which is approximately at the same height as the crank shaft 4. In this way, the position of the crank shaft 4 is defined both in the horizontal as well as in the vertical direction and reciprocation of the blade carriage 1 causes the crank shaft to be raised and lowered by a small amount, namely in a circular arc about the axis 8. The crank shaft 4 is shown in FIG. 1 as being driven by a motor 11 via a universal shaft 10; however, a different, and preferred, transmission is shown in FIGS. 3 and 4.

Figures 2A, 2B, 2C:
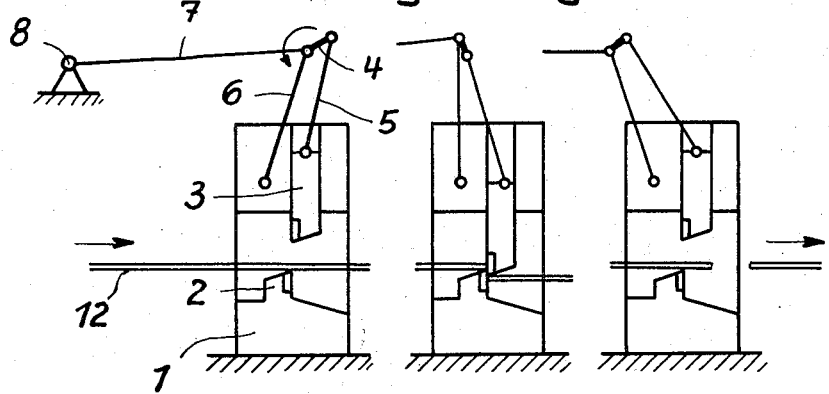
FIGS. 2a, 2b and 2c are three diagrammatic side views of the shears at three different working positions.

FIGS. 2a to 2c show different working positions of the shears. FIG. 2a shows the shears in the starting position. As soon as the cutting signal is transmitted by a measuring device (not shown), the blade carriage 1 is accelerated in the direction of movement of rolled stock 12 by a drive 19, 20 (shown only in FIGS. 3 and 4) until the blade carriage 1 achieves synchronism with the rolled stock; the blade carriage 1 is maintained at the speed of the rolled stock during the entire shearing operation. The shearing operation is controlled independently of the motion of the blade carriage 1. For shearing, the crank shaft 4 is rotated once in the anticlockwise direction. The top blade mount 3 has reached its lowest position in FIG. 2b and in FIG. 2c has returned into its starting position. The blade carriage 1 is then retracted into its position shown in FIG. 2a and is ready for the next cut.

Figure 4:
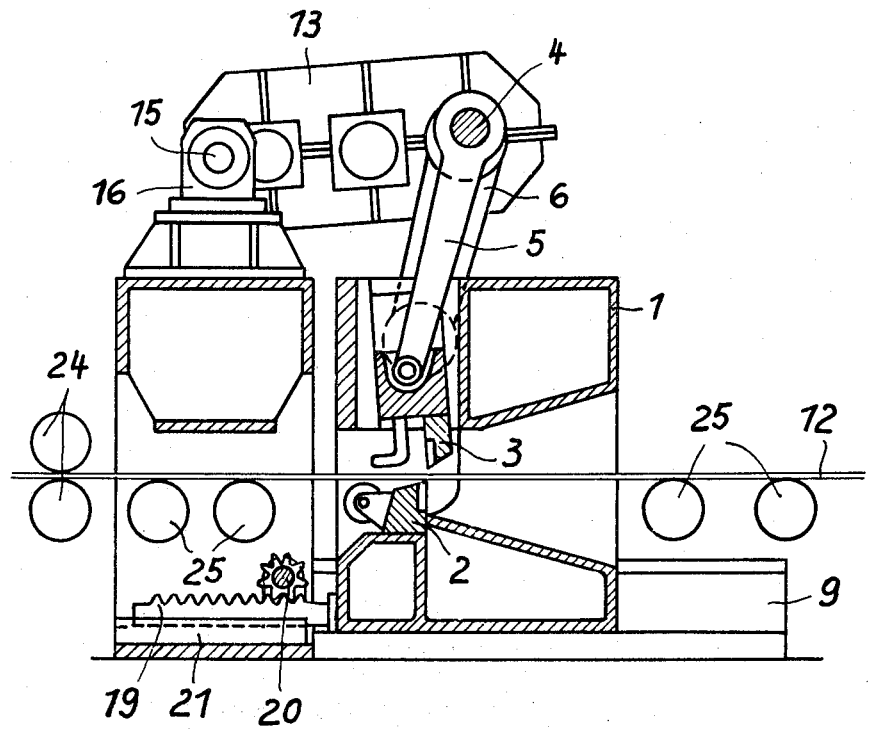
FIG. 4 is a longitudinal section through the shears, along the line IV—Iv of FIG. 3.

In FIGS. 3 and 4, the crank shaft 4 is rigidly coupled to and forms an integral unit with the output shaft 14 of a gear transmission 13 so that the output end of the transmission 13 is borne by the crank shaft 4. The transmission 13 in this case acts as the radius rod 7 shown in FIG. 2. The input shaft 15 of the transmission 13 is pivotally supported in fixed, stationary plummer or bearing blocks 16. The input shaft 15 is connected to a motor 18 via a coupling 17.

The blade carriage 1 is driven by a gear rack 19 which is slidably carried in a guide 21 and co-operates with a pinion 20. The pinion 20 is driven by a reversing motor (not shown) via a transmission 22 and coupling 23.

As may be seen by reference to FIG. 4, the rolled stock 12 (e.g. a sheet) is passed through the shears via feed rollers 24 and support rollers 25. The rotational speed of the feed rollers 24 is appropriately employed to control the speed of the carriage drive pinion 20 in order to provide the desired synchronism during the shearing operation.

I claim:

1. Flying guillotine shears for shearing moving rolled stock, the shears comprising:
   stationary mounting means;
   a movable blade carriage;
   guide means guiding said carriage for substantially horizontal movement in the direction of movement of said stock;
   means for moving said carriage in the same direction as and at the same speed as said stock during a cut;
   blade mounts for mounting two co-operating shear blades, said blade mounts being carried by said carriage;
   guide means guiding one of said blade mounts for substantially vertical movement with respect to the carriage;
   rotary crank shaft means independent of said carriage moving means for moving said moving blade mount to make a shearing cut;
   connecting rod means being pivotally connected to said crank shaft means and directly to said moving blade mount for transmitting force from said crank shaft means to said moving blade mount;
   link means connecting said crank shaft means to said carriage for transmitting the reaction to the shearing force from said carriage to said crank shaft means; and
   radius rod means connecting said crank shaft means to said stationary mounting means, said radius rod means being pivotal with respect to said fixed mounting means about an axis at approximately the same height as the axis of rotation of said crank shaft means.

2. Flying guillotine shears as claimed in claim 1, wherein said radius rod means comprises a gear transmission having an input shaft, an input end, an output shaft and an output end, said output shaft being integral with said crank shaft means and connected by said link means to said carriage and said transmission being mounted at said input end for pivotal movement about the axis of said input shaft.

3. Flying guillotine shears as claimed in claim 2, wherein said input shaft of said transmission is pivotally supported in stationary bearings.

4. Flying guillotine shears as claimed in claim 1, wherein said carriage moving means comprises a rack and pinion mechanism.

5. Flying guillotine shears as claimed in claim 2, wherein said carriage moving means comprises a rack and pinion mechanism.

* * * * *